US008548643B2

(12) United States Patent
Asano

(10) Patent No.: US 8,548,643 B2
(45) Date of Patent: Oct. 1, 2013

(54) INFORMATION PROVIDING DEVICE FOR VEHICLE

(75) Inventor: Yutaka Asano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 13/256,604

(22) PCT Filed: Mar. 15, 2010

(86) PCT No.: PCT/JP2010/054327

§ 371 (c)(1), (2), (4) Date: Sep. 14, 2011

(87) PCT Pub. No.: WO2010/110109

PCT Pub. Date: Sep. 30, 2010

(65) Prior Publication Data

US 2012/0010762 A1 Jan. 12, 2012

(30) Foreign Application Priority Data

Mar. 23, 2009 (JP) ................................ 2009-069940

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC .............................................................. 701/1

(58) Field of Classification Search
USPC ................................................ 701/1, 24, 424
See application file for complete search history.

(56) References Cited

U.S. PATENT DOCUMENTS 6,615,134 B2 * 9/2003 Ando ............................ 701/424
2002/0059017 A1 * 5/2002 Yamane et al. .................. 701/1

(Continued)

FOREIGN PATENT DOCUMENTS

CN 1782736 A 6/2006
CN 101395647 A 3/2009

(Continued)

OTHER PUBLICATIONS

Official Communication issued in Chinese Patent Application No. 201080013315.X, dated May 30, 2013, 7 pages.

*Primary Examiner* — Mary Cheung
*Assistant Examiner* — Frederick Brushaber
(74) *Attorney, Agent, or Firm* — Arent Fox LLP

(57) ABSTRACT

An information providing device for a vehicle is provided in which when the subject vehicle (VA) transmits to a base station (20) subject vehicle information including the position, speed of travel, and direction of travel of the subject vehicle (VA), moving object information including the position, speed of travel, and direction of travel of a detected vehicle (VB), and time information including the time at which the above has been obtained, the base station (20) calculates the probability of the presence of the detected vehicle (VB) on map data based on each of the above-mentioned pieces of information and transmits to the subject vehicle (VA) prediction information about the detected vehicle (VB) present in an intersection, including the subject vehicle position, based on the subject vehicle position and the probability of the presence of the detected vehicle (VB). This enables the avoidance of an intersection collision with the detected vehicle (VB) by issuing an alert or warning to an occupant of the subject vehicle (VA) based on the prediction information. During this process, since it is unnecessary for the detected vehicle (VB) to include the same equipments with the subject vehicle (VA), it is possible for the subject vehicle (VA) to avoid an intersection collision with all the detected vehicle (VB) including a vehicle which has no device such as inter-vehicle communication means and, moreover, since it is unnecessary to provide infrastructure for each intersection, realization is possible at a low cost.

10 Claims, 8 Drawing Sheets

(56) References Cited

U.S. PATENT DOCUMENTS

| | | | | |
|---|---|---|---|---|
| 2004/0083037 | A1* | 4/2004 | Yamane et al. | 701/1 |
| 2004/0117090 | A1 | 6/2004 | Samukawa et al. | |
| 2007/0100537 | A1 | 5/2007 | Parikh et al. | |
| 2009/0024357 | A1 | 1/2009 | Aso et al. | |
| 2010/0256836 | A1* | 10/2010 | Mudalige | 701/2 |
| 2010/0256852 | A1* | 10/2010 | Mudalige | 701/24 |
| 2012/0095674 | A1* | 4/2012 | Lee et al. | 701/423 |

FOREIGN PATENT DOCUMENTS

| | | | |
|---|---|---|---|
| EP | 1 990 786 | A1 | 11/2008 |
| JP | 4-290200 | A | 10/1992 |
| JP | 2001-126198 | A | 5/2001 |
| JP | 2003-203243 | A | 7/2003 |
| JP | 2005-227978 | A | 8/2005 |
| JP | 2006-195641 | A | 7/2006 |
| WO | WO 2007/102367 | A1 | 9/2007 |
| WO | WO 2008/056806 | A1 | 5/2008 |

* cited by examiner

INFORMATION PROVIDING DEVICE FOR VEHICLE

CROSS-REFERENCE TO RELATED APPLICATION

This Application is a National Stage entry of International Application No. PCT/JP2010/054327, having an international filing date of Mar. 15, 2010, which claims priority to Japanese Application No.: 2009-069940, filed Mar. 23, 2009, the disclosure of each of which is hereby incorporated in its entirety by reference.

TECHNICAL FIELD

The present invention relates to an information providing device for a vehicle, the device providing an occupant of a subject vehicle with information about a moving object that has a possibility of coming close to the subject vehicle on a path of the subject vehicle by intercommunication between the subject vehicle and a base station.

BACKGROUND ART

An arrangement in which information about position, direction of travel, and speed of travel of a subject vehicle and another vehicle is exchanged by means of inter-vehicle communication therebetween, and when there is a possibility of the subject vehicle and the other vehicle simultaneously entering an intersection present in the direction of travel of the subject vehicle on map data, a warning is issued to the driver of the subject vehicle by means of a buzzer, etc. is known from Patent Document 1 below.

An arrangement in which, in order to prevent an intersection collision when a vehicle traveling on a non-priority road enters an intersection with a priority road, a coverage area is set on the non-priority road prior to the intersection, when the vehicle on the non-priority road enters the coverage area, data on the vehicle on the priority road is transmitted to the vehicle on the non-priority road by road-vehicle communication, and when there is a possibility of a collision a warning is issued to the driver or automatic braking is carried out is known from Patent Document 2 below.

PRIOR ART DOCUMENTS

Patent Documents

Patent Document 1: Japanese Patent Application Laid-open No. 4-290200

Patent Document 2: Japanese Patent Application Laid-open No. 2001-126198

SUMMARY OF THE INVENTION

Problems to be Solved by the Invention

With regard to the invention of Patent Document 1 above, since information exchange cannot be carried out between a vehicle having inter-vehicle communication means and a vehicle not having inter-vehicle communication means, the probability of obtaining a collision avoidance effect between the vehicles is the product of the probabilities of the two vehicles each having inter-vehicle communication means. For example, when the percentage prevalence of the vehicular inter-vehicle communication means is 10%, the probability of obtaining a collision avoidance effect when any two vehicles come close to each other is as small as 1%, which is a problem.

Furthermore, the invention described in Patent Document 2 above has the problem that since it requires the provision of infrastructure for collision avoidance at each intersection, enormous cost is needed when many intersections are equipped with the infrastructure.

The present invention has been accomplished in light of the above-mentioned circumstances, and it is an object thereof to prevent an intersection accident with a vehicle not equipped with a device such as inter-vehicle communication means.

Means for Solving the Problems

In order to attain the above object, according to a first aspect of the present invention, there is provided an information providing device for a vehicle for providing to an occupant of a subject vehicle information about a moving object that has a possibility of coming close to the subject vehicle on a path of the subject vehicle by carrying out intercommunication between the subject vehicle and a base station, the subject vehicle comprising subject vehicle information detection means for detecting subject vehicle information including a position, speed of travel, and direction of travel of the subject vehicle, moving object detection means for detecting the moving object that is present in an area around the subject vehicle, moving object information calculation means for calculating moving object information including the position, speed of travel, and direction of travel of the moving object based on detection results of the moving object detection means and the subject vehicle information, first transmitting means for transmitting to the base station the subject vehicle information, the moving object information, and the time at which the information has been obtained, first receiving means for receiving a signal from the base station, and information providing means for carrying out provision of information to an occupant, the base station comprising second receiving means for receiving a signal transmitted by the first transmitting means, base station side map data storage means for storing map data, moving object probability of presence calculation means for calculating the probability of a moving object being present on the map data based on the moving object information and the time information obtained by the second receiving means, and second transmitting means for transmitting to the subject vehicle prediction information about the moving object present within a predetermined range that includes the subject vehicle position based on the subject vehicle position and the probability of the moving object being present obtained by the second receiving means, wherein the information providing means carries out provision of information to the occupant based on the subject vehicle position and the prediction information received by the first receiving means.

Further, according to a second aspect of the present invention, in addition to the first aspect, the subject vehicle detects an intersection present in the direction of travel of the subject vehicle based on the subject vehicle position detected by subject vehicle side map data storage means for storing map data and the subject vehicle information detection means and the map data stored in the subject vehicle side map data storage means, and when it is determined from prediction information with respect to the moving object transmitted from the second transmitting means of the base station that the moving object will enter the intersection, the information providing means carries out provision of information to the occupant.

Furthermore, according to a third aspect of the present invention, in addition to the second aspect, the information providing means carries out provision of information to the occupant when the speed of travel of the subject vehicle is a predetermined value or greater and the probability of presence of a moving object that will enter an intersection present in the direction of travel of the subject vehicle is a predetermined value or greater.

Moreover, according to a fourth aspect of the present invention, in addition to any one of the first to third aspects, the moving object probability of presence calculation means calculates the probability of a moving object being present at a predetermined position based on the time that has elapsed from the time when the moving object detection means detected the moving object.

Further, according to a fifth aspect of the present invention, in addition to any one of the first to fourth aspects, the moving object probability of presence calculation means calculates the probability of a moving object being present at a predetermined position based on the distance between the position of the moving object detected by the moving object detection means and the predetermined position.

Furthermore, according to a sixth aspect of the present invention, in addition to any one of the first to fifth aspects, the moving object probability of presence calculation means calculates the probability of a moving object being present at a predetermined position based on road-branching information of the map data stored in the base station side map data storage means.

A detected vehicle VB of an embodiment corresponds to the moving object of the present invention, a laser radar device 11 of the embodiment corresponds to the moving object detection means of the present invention, and a navigation system 12 of the embodiment corresponds to the subject vehicle information detection means or the subject vehicle side map data storage means of the present invention.

Effects of the Invention

In accordance with the first aspect of the present invention, since, when the subject vehicle transmits to the base station subject vehicle information including the position, speed of travel, and direction of travel of the subject vehicle, moving object information including the position, speed of travel, and direction of travel of the moving object, and time information including the time at which the above has been obtained, the base station calculates the probability of the presence of a moving object on map data based on each of the above-mentioned pieces of information and transmits to the subject vehicle prediction information about a moving object present within a predetermined range, including the subject vehicle position, based on the subject vehicle position and the probability of the presence of a moving object, it is possible for the subject vehicle to avoid an intersection collision with a moving object by carrying out provision of information to the occupant based on the prediction information. During this process, since it is unnecessary for the moving object to include means for detecting subject vehicle information or moving object information or means for communicating with the subject vehicle or the base station, it is possible for the subject vehicle to avoid an intersection collision with all moving objects as targets and, moreover, since it is unnecessary to provide infrastructure for each intersection, realization is possible at a low cost.

Furthermore, in accordance with the second aspect of the present invention, since the subject vehicle detects an intersection that is present in the direction of travel of the subject vehicle based on the map data and the subject vehicle position on the map data and carries out provision of information to the occupant when it is determined from prediction information about a moving object transmitted from the base station that the moving object will enter the intersection, it is possible to avoid a collision with the moving object at the intersection effectively.

Moreover, in accordance with the third aspect of the present invention, since the information providing means carries out provision of information to the occupant when the speed of travel of the subject vehicle is a predetermined value or greater and the probability of the presence of a moving object that enters an intersection present in the direction of travel of the subject vehicle is a predetermined value or greater, it is possible to avoid a collision with the moving object effectively by carrying out provision of information in the case where avoidance is difficult when coming close to the moving object at the intersection.

Furthermore, in accordance with the fourth aspect of the present invention, since the moving object probability of presence calculation means calculates the probability of the presence of a moving object at a predetermined position based on the time that has elapsed after the moving object detection means detects the moving object, it is possible to calculate the probability of the presence of a moving object with good precision.

Moreover, in accordance with the fifth aspect of the present invention, since the moving object probability of presence calculation means calculates the probability of the presence of a moving object at a predetermined position based on the distance to the predetermined position from the position of the moving object detected by the moving object detection means, it is possible to calculate the probability of the presence of a moving object with good precision.

Furthermore, in accordance with the sixth aspect of the present invention, since the moving object probability of presence calculation means calculates the probability of the presence of a moving object at a predetermined position based on road-branching information in the map data stored in the base station side map data storage means, it is possible to calculate the probability of the presence of a moving object with good precision.

EXPLANATION OF REFERENCE NUMERALS AND SYMBOLS

Figure 1:
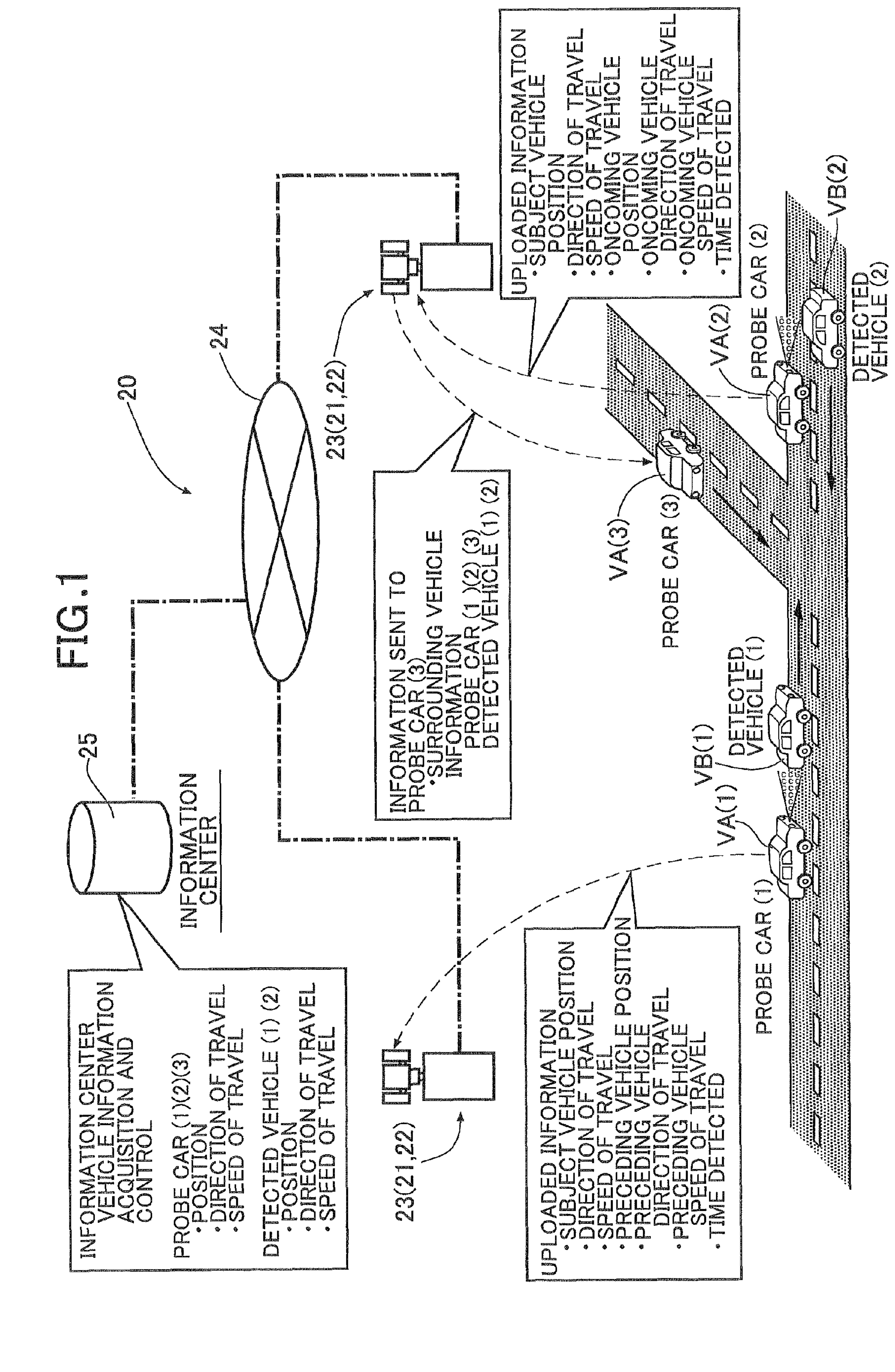
FIG. 1 is a diagram showing the system configuration of an information providing device for a vehicle. (first embodiment)

VA Subject vehicle
VB Detected vehicle (moving object)
11 Laser radar device (moving object detection means)
12 Navigation system (subject vehicle information detection means, subject vehicle side map data storage means)
16 Information providing means
**17*a*** Moving object information calculation means
18 First transmitting means
19 First receiving means
20 Base station
21 Second transmitting means
22 Second receiving means
27 Base station side map data storage means
**26*a*** Moving object probability of presence calculation means

MODE FOR CARRYING OUT THE INVENTION

A mode for carrying out the present invention is explained below by reference to FIG. 1 to FIG. 8.

First Embodiment

Figure 2:
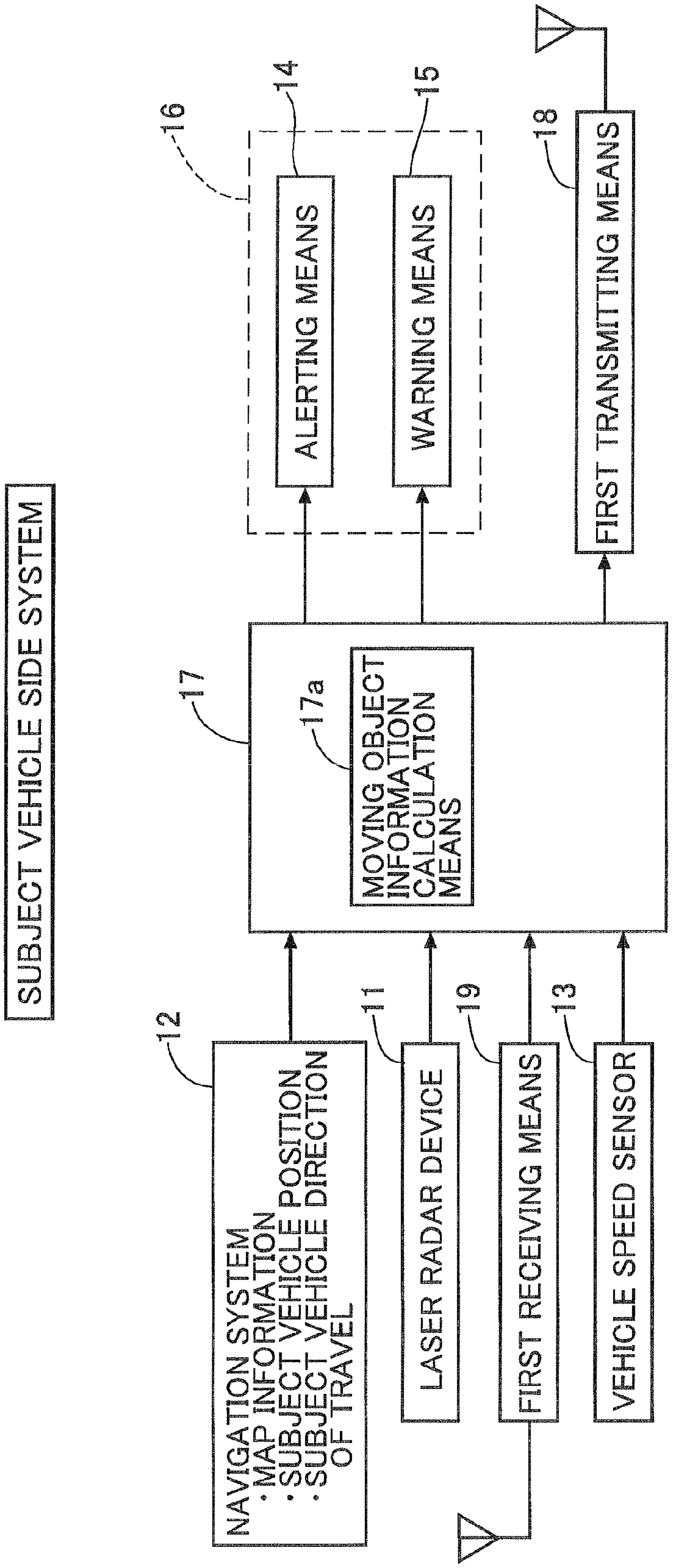
FIG. 2 is a block diagram of a subject vehicle side system. (first embodiment)

As shown in FIG. 1 and FIG. 2, a subject vehicle VA is for example a probe car equipped with a laser radar device 11 forming moving object detection means, and detects by the laser radar device 11 another vehicle (hereinafter, called a detected vehicle VB) that is present in the vicinity of the subject vehicle VA. The detected vehicle VB includes a preceding vehicle that is traveling in front of the subject vehicle VA in the same direction, a following vehicle that is traveling behind the subject vehicle VA in the same direction, an oncoming vehicle that is approaching from the front of the subject vehicle VA, etc. The subject vehicle VA is equipped with a navigation system 12 that is provided with a function of storing map data, a function of detecting the subject vehicle position, and a function of detecting the direction of travel of the subject vehicle VA. Furthermore, the subject vehicle VA includes a vehicle speed sensor 13 for detecting the vehicle speed of the subject vehicle VA, alerting means 14 for alerting the driver by means of sound, an image, light, etc., and warning means 15 for issuing a warning to the driver by means of sound, an image, light, etc. The alerting means 14 and the warning means 15 correspond to information providing means 16 that is formed from the same speaker, display, lamp, etc., and the alert function and the warning function can be exhibited selectively according to the intensity of a signal outputted thereby.

The navigation system 12 forms first map information storage means, and forms subject vehicle information detection means in cooperation with the vehicle speed sensor 13. Subject vehicle information detected by the subject vehicle information detection means includes the position of the subject vehicle VA, the direction of travel of the subject vehicle VA, and the speed of travel of the subject vehicle VA on a map stored in the first map information storage means.

An electronic control unit 17 of the subject vehicle VA to which are connected the laser radar device 11, the navigation system 12, the vehicle speed sensor 13, and the information providing means 16 includes moving object information calculation means **17*a*. The moving object information calculation means 17*a* calculates the position of a detected vehicle VB, the direction of travel of the detected vehicle VB, and the speed of travel of the detected vehicle VB on the map stored in the first map information storage means by comparing the position of the subject vehicle VA and the direction of travel and speed of travel of the subject vehicle VA detected by the subject vehicle information detection means with the relative direction of travel and relative speed of travel of the detected vehicle VB detected by the laser radar device 11**.

Connected to the electronic control unit 17 are first transmitting means 18 and first receiving means 19, the first transmitting means 18 transmitting to a base station 20, which is described later, the position, direction of travel, and speed of travel of the subject vehicle VA as subject vehicle information, the position, direction of travel, and speed of travel of a detected vehicle VB as moving object information, and time information including the time at which the above information is detected or calculated. The first receiving means 19 receives information about the detected vehicle VB transmitted from the base station 20, that is, information about a detected vehicle VB that has a possibility of meeting the subject vehicle VA at an intersection on the path of the subject vehicle VA, and the information providing means 16 issues an alert or warning to the driver according to the degree of possibility of a collision at that time.

Figure 3:
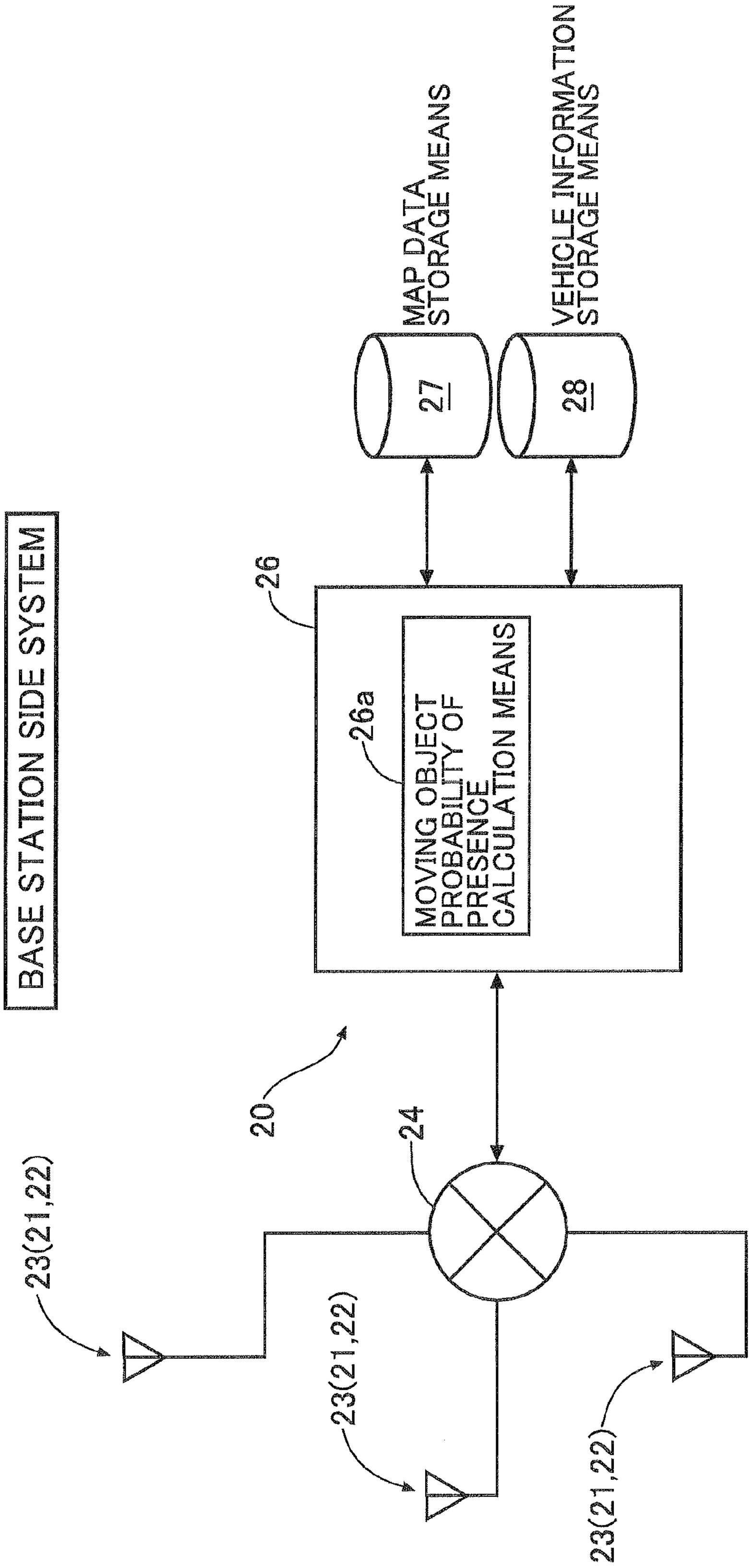
FIG. 3 is a block diagram of a base station side system. (first embodiment)

As shown in FIG. 1 and FIG. 3, the base station 20 is formed from a large number of communication antennas 23 that each include second transmitting means 21 and second receiving means 22, and an information center 25 to which each of the communication antennas 23 is connected via a network 24. An information server 26 of the information center 25 includes moving object probability of presence calculation means **26*a* and calculates the probability of subject vehicles VA and detected vehicles VB being present at each position on the road from the subject vehicle information, moving object information, and time information transmitted from the plurality of first transmitting means 18 of subject vehicles VA and the map data stored in base station side map data storage means 27. The probability of being present is stored in vehicle information storage means 28, sequentially updated, and transmitted from the second transmitting means 21 to the first receiving means 19** of each subject vehicle VA.

Figure 4:
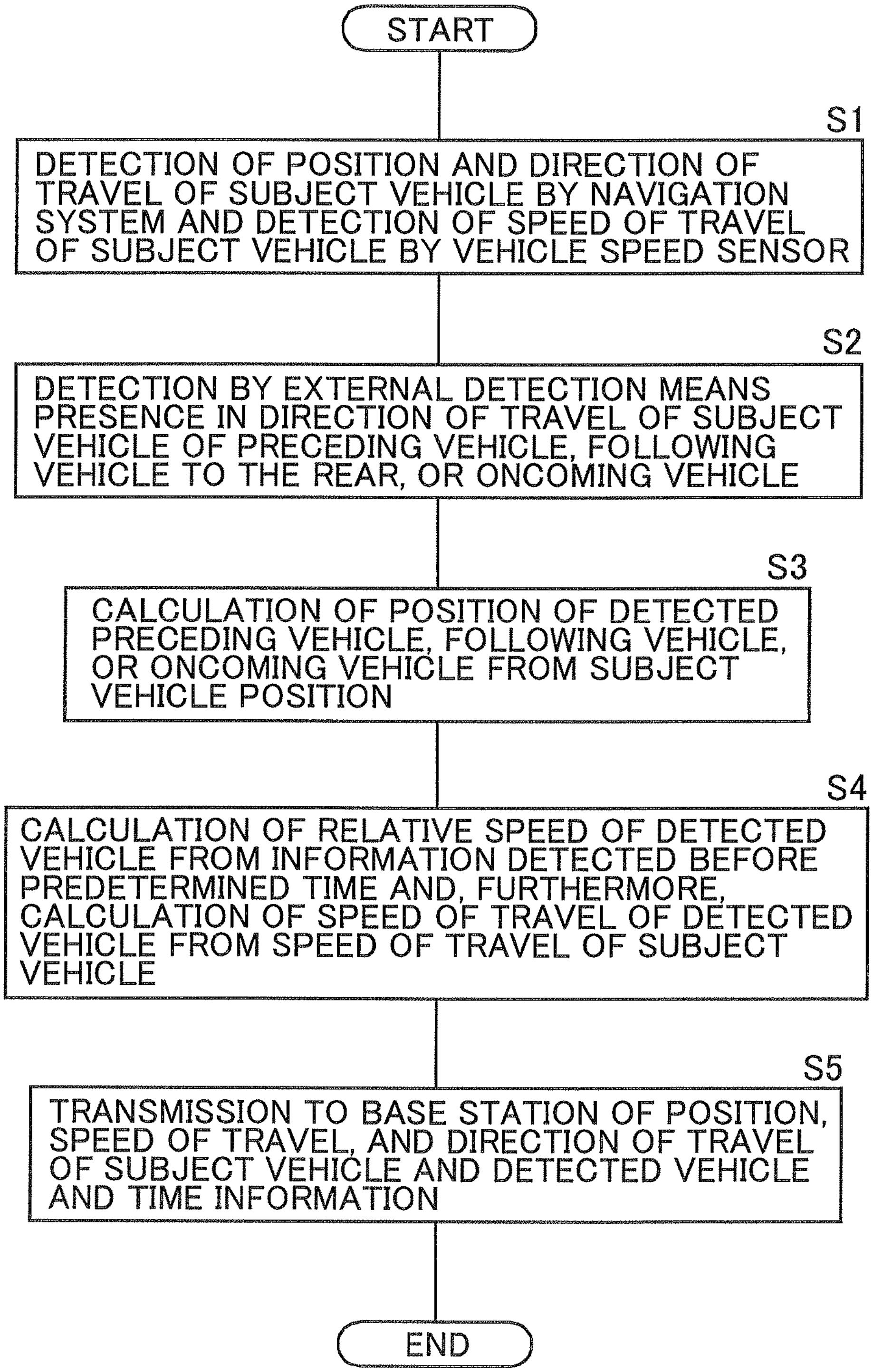
FIG. 4 is a flowchart of detection processing for a detected vehicle in the subject vehicle. (first embodiment)

Detection processing for the detected vehicle VB carried out in the subject vehicle VA (probe car) is now explained further by reference to FIG. 4.

Step S1: detection, by the navigation system 12, of the position and direction of travel of the subject vehicle VA on the map data, and detection of the vehicle speed of the subject vehicle VA by the vehicle speed sensor 13.

Step S2: detection by the laser radar device 11, which is the moving object detection means, of the presence of a detected vehicle VB such as a preceding vehicle in front in the direction of travel of the subject vehicle VA, a following vehicle behind the subject vehicle VA in the direction of travel thereof, or an oncoming vehicle traveling toward the subject vehicle VA.

Step S3: calculation of a position on the map data of the detected vehicle VB detected by the laser radar device 11. The position of the detected vehicle VB on the map data can be calculated using the relative position, with respect to the subject vehicle VA, of the detected vehicle VB detected by the laser radar device 11 since the position of the subject vehicle VA on the map data is known.

Step S4: calculation of relative speed of travel and relative direction of travel of the detected vehicle VB with respect to the subject vehicle VA by comparing the relative position of the detected vehicle VB detected by the laser radar device 11 the last time (one cycle before) with the relative position of the detected vehicle VB detected this time, and calculation of the absolute speed of travel and direction of travel of the detected vehicle VB by comparing the relative speed of travel and the relative direction of travel with the vehicle speed and direction of travel of the subject vehicle VA.

Step S5: transmission of the position, direction of travel, and speed of travel of the subject vehicle VA, which are subject vehicle information, the position, direction of travel, and speed of travel of the detected vehicle VB, which are moving object information, and the current time, which is time information, from the first transmitting means 18 of the subject vehicle VA to the second receiving means 22 of the base station 20 at predetermined time intervals.

Figure 5:
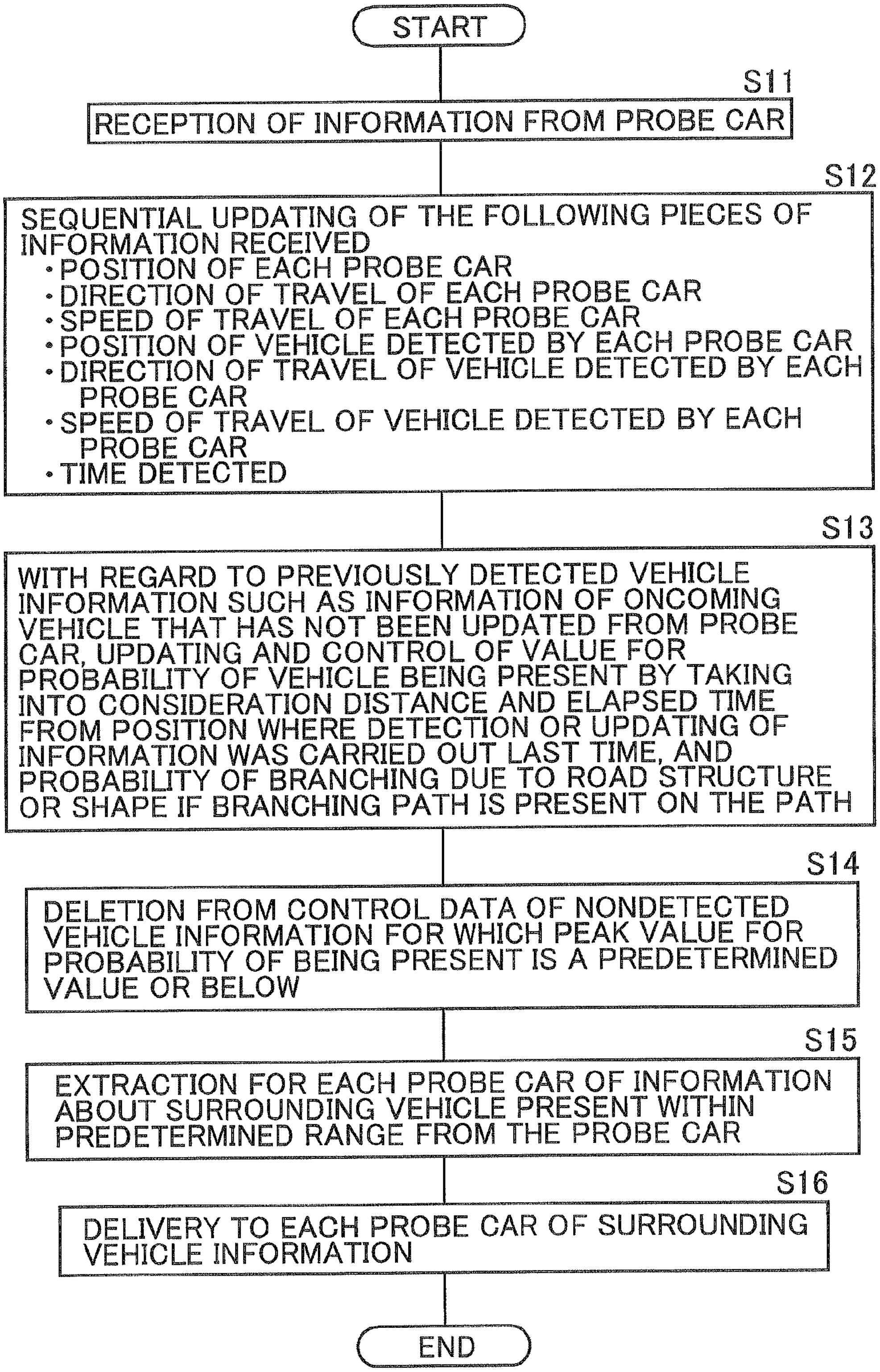
FIG. 5 is a flowchart of information processing for a detected vehicle in the base station. (first embodiment)

Information processing with respect to the detected vehicle VB carried out in the base station 20 is now explained by reference to FIG. 5.

Step S11: reception, by the second receiving means 22 of the base station 20, of the position, direction of travel, and speed of travel of the subject vehicle VA, which are subject vehicle information, the position, direction of travel, and speed of travel of the detected vehicle VB, which are moving object information, and the current time, which is time information, transmitted from first transmitting means 18 of the subject vehicle VA.

Step S12: storage and sequential updating in the vehicle information storage means 28 by the information center 25 of the base station 20 of each of the above-mentioned pieces of data received at predetermined time intervals.

Step S13: with regard to moving object information currently received subsequent to the previous time, the previous information is overwritten with the current information. Furthermore, with regard to moving object information that is not currently received but that was received the previous time due to the subject vehicle VA or the detected vehicle VB changing course, etc., the current position is estimated from the information received the last time. The estimated current position is expressed as the probability of the detected vehicle VB being present at a given position on the map data stored in the base station side map data storage means 27. The moving object probability of presence calculation means **26*a* of the information server 26 of the base station 20** calculates the probability of the detected vehicle VB being present as follows.

Figure 7:
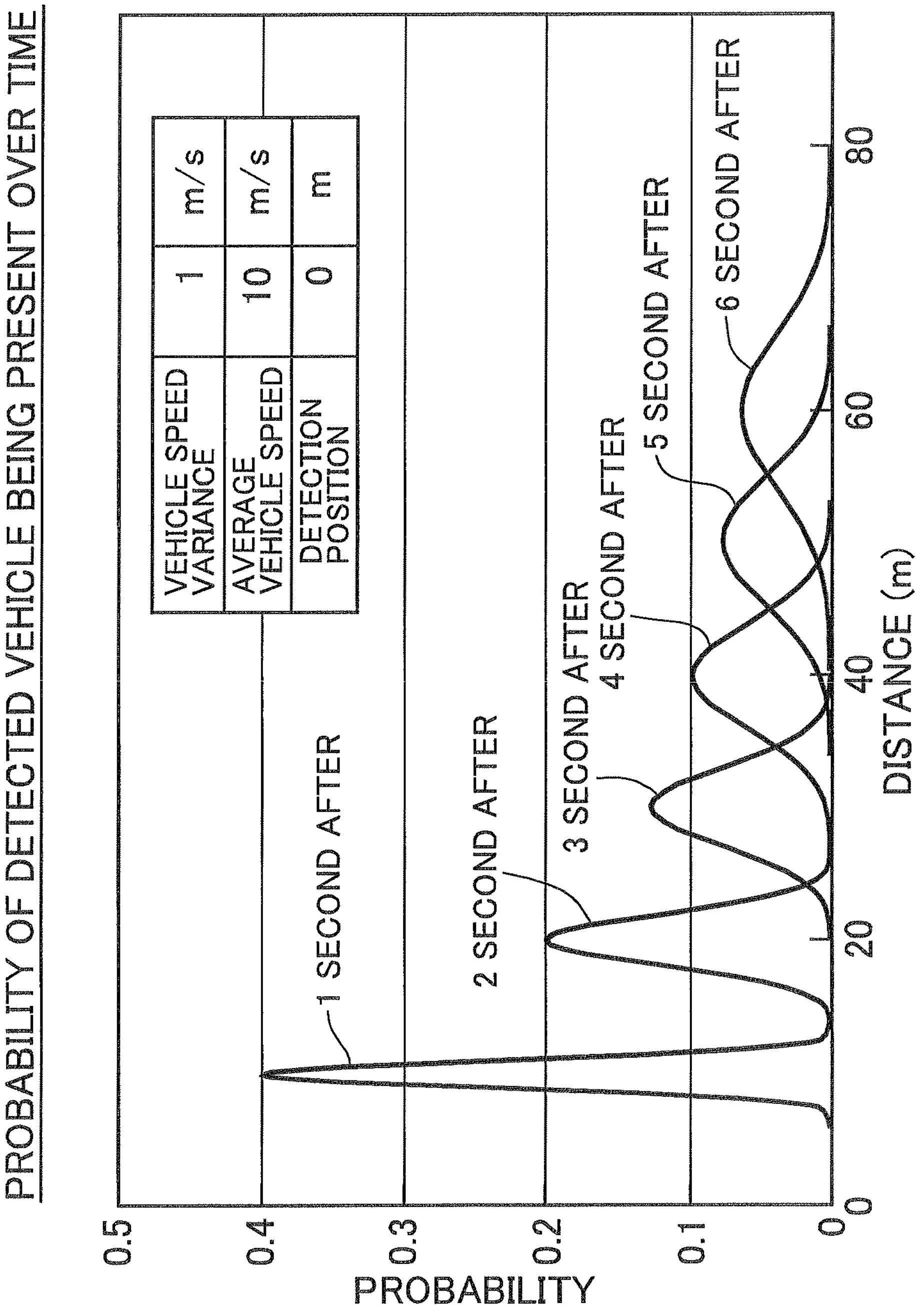
FIG. 7 is a graph showing one example of the probability of a detected vehicle being present according to the distance from the detection position with respect to time elapsed from detection. (first embodiment)

FIG. 7 shows one example of the probability of the detected vehicle VB being present at each position after a predetermined time. When the average vehicle speed of the detected vehicle VB is 10 m/s, the vehicle speed variance is 1 m/s, and the current position distance is 0 m (reference position), 1 second thereafter the probability of being present at a distance of 10 m becomes a maximum, 2 seconds thereafter the probability of being present at a distance of 20 m becomes a maximum, 3 seconds thereafter the probability of being present at a distance of 30 m becomes a maximum, 4 seconds thereafter the probability of being present at a distance of 40 m becomes a maximum, 5 seconds thereafter the probability of being present at a distance of 50 m becomes a maximum, and 6 seconds thereafter the probability of being present at a distance of 60 m becomes a maximum. The probability of being present at the respective times decreases as time passes, and the variance of the distance increases as time passes. In this way, the probability of the detected vehicle VB being present at a predetermined position changes accompanying the elapse of time and the change in distance.

Figure 8:
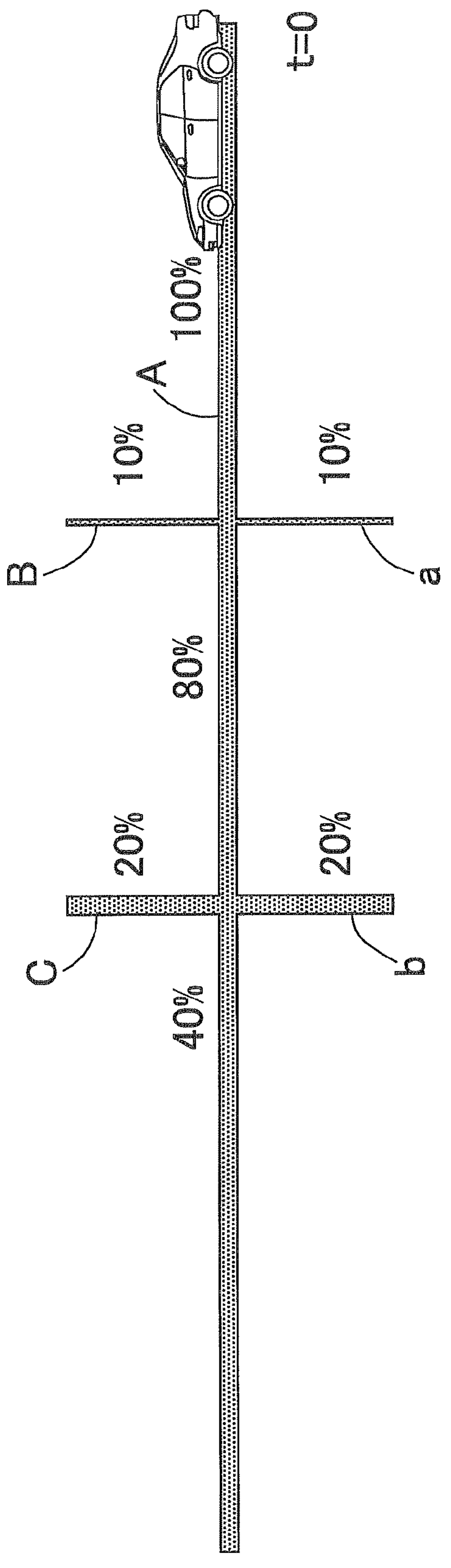
FIG. 8 is a diagram showing one example of the probability of a detected vehicle being present according to the state of road branching. (first embodiment)

FIG. 8 shows one example of the probability of being present according to the state of branching of the road in front of the detected vehicle VB. Assume that a wide road A on which the detected vehicle VB is traveling intersects with a narrow road B at an intersection a, and intersects with a wide road C at an intersection b. Since the probability of turning right or left to the narrow road B is small, the probability of the detected vehicle VB being present after passing through the intersection a is that the probability of being present on road A is 80% and the probability of being present to the left or right on road B is 10% for each. Moreover, the probability of the detected vehicle VB that has passed beyond the intersection a of the road A turning right or left to the wide road C at the intersection b is larger than the probability of turning right or left at the narrow intersection a; the probability of being present on road A is 40%, and the probability of being present to the left or right on road B is 20% for each. In this way, the probability of the detected vehicle VB being present in each part of the road changes according to the state of branching of the road or the width of the road.

As hereinbefore described, since the moving object probability of presence calculation means **26*a*** calculates the probability of the detected vehicle VB being present at a predetermined position based on the time that has elapsed after the subject vehicle information and the moving object information are obtained, the distance from the position at which the subject vehicle information and the moving object information are obtained, and the road-branching information on the map data, the probability of the detected vehicle VB being present can be calculated with good precision.

Step S14: deletion from the vehicle information storage means 28 information about a detected vehicle VB that has not already been detected and for which the peak value of the probability of being present is a predetermined value or below.

Step S15: extraction from the vehicle information storage means 28 information about detected vehicles VB (surrounding vehicles) present within a predetermined range from the current position of each subject vehicle VA (probe car), and transmission of the information from the second transmitting means 21 of the base station 20 to each subject vehicle VA.

Figure 6:
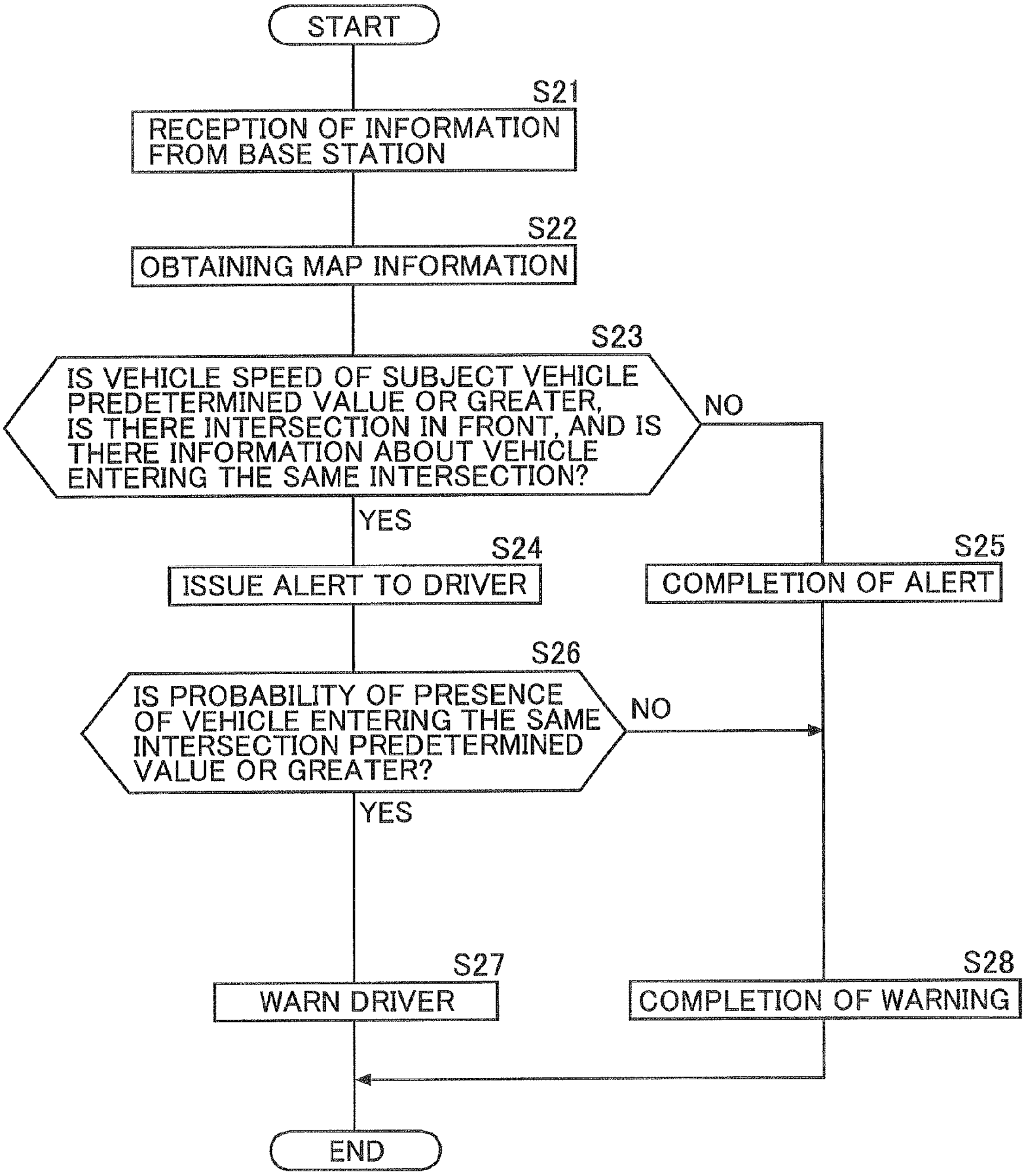
FIG. 6 is a flowchart of information provision processing to a driver in the subject vehicle. (first embodiment)

Processing of provision of information to the driver of the subject vehicle VA (probe car) carried out in the subject vehicle VA is now explained by reference to FIG. 6.

Step S21: reception of information from the second transmitting means 21 of the base station 20 by the first receiving means 19 of the subject vehicle VA.

Step S22: obtaining map information from the navigation system 12.

Step S23: determination of whether or not the vehicle speed of the subject vehicle VA detected by the vehicle speed sensor 13 is a predetermined value or greater, whether or not there is an intersection in front in the direction of travel of the subject vehicle VA on the map data, and whether or not information about a detected vehicle VB entering the intersection is received.

Step S24: if the answer in step S23 above is YES, it is determined that there is a possibility of an intersection collision of the subject vehicle VA with the detected vehicle VB at the intersection, and the alerting means 14 of the information providing means 16 is operated to thus issue an alert in order to avoid collision with the detected vehicle VB.

Step S25: if the answer in step S23 above is NO, it is determined that there is no possibility of an intersection collision of the subject vehicle VA with the detected vehicle VB at the intersection, and the alerting means 14 of the information providing means 16 is not operated or if it is in operation the operation is stopped.

Step S26: determination of whether or not the probability of a detected vehicle VB entering the intersection being present is a predetermined value or greater.

Step S27: if the answer in step S26 above is YES, it is determined that there is a possibility of an intersection collision of the subject vehicle VA with the detected vehicle VB at the intersection, and the warning means 15 of the information providing means 16 is operated to thus issue a warning to the driver in order that a collision with the detected vehicle VB can be avoided.

Step S25: if the answer in step S26 above is NO, it is determined that there is no possibility of an intersection collision of the subject vehicle VA with the detected vehicle VB at the intersection, and the warning means 15 of the information providing means 16 is not operated or if it is in operation the operation is stopped.

In addition, when the information providing means 16 employs an image as a medium, in the case of an alert the brightness of the image is set low, and in the case of a warning the brightness of the image is set high. Furthermore, when the information providing means 16 employs sound as a medium, in the case of an alert the intensity of the sound is set soft, and in the case of a warning the intensity of the sound is set loud.

For example, in FIG. 1, when a subject vehicle VA(3) attempts to enter the intersection in front, another subject vehicle VA(2) approaches from the left side of the intersection and a detected vehicle VB (1) approaches from the right side of the intersection, but if there is a possibility of the subject vehicle VA(3) colliding with the subject vehicle VA(2) or the detected vehicle VB (1), an alert or warning is issued to the driver of the subject vehicle VA(1), thereby enabling an intersection collision to be avoided.

As hereinbefore described, when the subject vehicle VA transmits to the base station 20 subject vehicle information including the position, speed of travel, and direction of travel of the subject vehicle VA, moving object information including the position, speed of travel, and direction of travel of a detected vehicle VB, and time information including the time at which the above are obtained, the base station 20 calculates the probability of presence of a moving object on the map data based on each piece of information and transmits to the subject vehicle VA prediction information about the detected vehicle VB entering an intersection that the subject vehicle VA enters based on the subject vehicle position and the probability of the detected vehicle VB being present, and by issuing an occupant alert or warning to the driver of the subject vehicle VA based on the prediction information an intersection collision with the detected vehicle VB can therefore be avoided.

Moreover, since it is unnecessary for the detected vehicle VB to be equipped with means for detecting subject vehicle information or moving object information or means for carrying out communication with the subject vehicle VA or the base station 20, it is possible to avoid an intersection collision with all of the detected vehicles VB as targets and, moreover, since it is unnecessary to prepare infrastructure for each intersection, realization can be achieved at low cost.

A mode for carrying out the present invention is explained above, but the present invention may be modified in a variety of ways as long as the modifications do not depart from the spirit and scope thereof.

For example, in the embodiment the laser radar device 11 is illustrated as the moving object detection means, but the moving object detection means may be a millimeter wave radar device or a TV camera.

Furthermore, in the embodiment the detected vehicle VB is illustrated as the moving object, but the moving object may be a pedestrian.

Moreover, in the embodiment the information providing means 16 provides information to the driver by means of an image or a sound, but an alert or warning to the driver may be issued by operating automatic braking or applying a steering reaction force to a steering wheel.

The invention claimed is:

1. An information providing device for a vehicle for providing to an occupant of a subject vehicle information about a moving object that has a possibility of coming close to the subject vehicle on a path of the subject vehicle by carrying out intercommunication between the subject vehicle and a base station, the subject vehicle comprising:

a subject vehicle information detection device for detecting subject vehicle information including a position, speed of travel, and direction of travel of the subject vehicle, a moving object detection device for detecting the moving object that is present in an area around the subject vehicle, a moving object information calculation device for calculating moving object information including the position, speed of travel, and direction of travel of the moving object based on detection results of the moving object detection device and the subject vehicle information, a first transmitting device for transmitting to the base station the subject vehicle information, the moving object information, and the time at which the information has been obtained, a first receiving device for receiving a signal from the base station, and an information providing device for presenting information to an occupant; and the base station comprising:

a second receiving device for receiving a signal transmitted by the first transmitting device, a base station side map data storage device for storing map data, a moving object probability of presence calculation device for calculating the probability of a moving object being present on the map data based on the moving object information and the time information obtained by the second receiving device, and a second transmitting device for transmitting to the subject vehicle prediction information about the moving object present within a predetermined range that includes the subject vehicle position based on the subject vehicle position and the probability of the moving object being present obtained by the second receiving device, wherein the information providing device presents information to the occupant based on the subject vehicle position and the prediction information received by the first receiving device.

2. The information providing device for a vehicle according to claim 1, wherein the subject vehicle detects an intersection present in the direction of travel of the subject vehicle based on the subject vehicle position detected by subject vehicle side map data storage device for storing map data and the subject vehicle information detection device and the map data stored in the subject vehicle side map data storage device, and when it is determined from prediction information with respect to the moving object transmitted from the second transmitting device of the base station that the moving object will enter the intersection, the information providing device presents information to the occupant.

3. The information providing device for a vehicle according to claim 2, wherein the information providing device presents information to the occupant when the speed of travel of the subject vehicle is equal to or greater than a predetermined value and the probability of presence of a moving object that will enter an intersection present in the direction of travel of the subject vehicle is equal to or greater than a predetermined value.

4. The information providing device for a vehicle according to any one of claim 1 to claim 3, wherein the moving object probability of presence calculation device calculates the probability of a moving object being present at a predetermined position based on the time that has elapsed from the time when the moving object detection device detected the moving object.

5. The information providing device for a vehicle according to any one of claim 1 to claim 3, wherein the moving object probability of presence calculation device calculates the probability of a moving object being present at a predetermined position based on the distance between the position of the moving object detected by the moving object detection device and the predetermined position.

6. The information providing device for a vehicle according to any one of claim 1 to claim 3, wherein the moving object probability of presence calculation device calculates the probability of a moving object being present at a predetermined position based on road-branching information of the map data stored in the base station side map data storage device.

7. The information providing device for a vehicle according to claim 4, wherein the moving object probability of presence calculation device calculates the probability of a moving object being present at a predetermined position based on the distance between the position of the moving object detected by the moving object detection device and the predetermined position.

8. The information providing device for a vehicle according to claim 4, wherein the moving object probability of presence calculation device calculates the probability of a moving object being present at a predetermined position based on road-branching information of the map data stored in the base station side map data storage device.

9. The information providing device for a vehicle according to claim 5, wherein the moving object probability of presence calculation device calculates the probability of a moving object being present at a predetermined position based on road-branching information of the map data stored in the base station side map data storage device.

10. The information providing device for a vehicle according to claim 7, wherein the moving object probability of presence calculation device calculates the probability of a moving object being present at a predetermined position based on road-branching information of the map data stored in the base station side map data storage device.

* * * * *